US007260061B2

(12) United States Patent
Pellert

(10) Patent No.: US 7,260,061 B2
(45) Date of Patent: Aug. 21, 2007

(54) INTER-NETWORK CONNECTION SETUP THROUGH A TRANSIT NETWORK

(75) Inventor: Martin Pellert, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 1086 days.

(21) Appl. No.: 10/229,497

(22) Filed: Aug. 28, 2002

(65) Prior Publication Data

US 2003/0161334 A1 Aug. 28, 2003

(30) Foreign Application Priority Data

Feb. 25, 2002 (DE) ............... 102 08 048

(51) Int. Cl.
*H04L 12/56* (2006.01)
(52) U.S. Cl. ............... 370/230; 370/395.2; 370/401
(58) Field of Classification Search ................ 370/230, 370/395.2, 395.3, 401
See application file for complete search history.

(56) References Cited

U.S. PATENT DOCUMENTS

| 4,741,027 | A | 4/1988 | Maisel et al. ............... 379/221 |
| 5,933,412 | A | 8/1999 | Choudhury et al. ........ 370/218 |
| 6,343,065 | B1 * | 1/2002 | Serbest et al. ............... 370/230 |
| 6,347,088 | B1 * | 2/2002 | Katou et al. ............ 370/395.2 |
| 6,363,065 | B1 * | 3/2002 | Thornton et al. .......... 370/352 |
| 2003/0163571 | A1 * | 8/2003 | Pellert et al. ................ 709/227 |
| 2003/0163572 | A1 | 8/2003 | Hierholzer et al. ......... 709/227 |

FOREIGN PATENT DOCUMENTS

| DE | 10038878 C1 | 8/2000 |
| EP | 0917378 A2 | 10/1998 |
| EP | 0999712 A2 | 5/2000 |
| WO | WO 00/62493 A1 | 10/2000 |

OTHER PUBLICATIONS

"Evolution of Switching Architecture to support Voice Telephony over ATM", Judith R. McGoogan et al. Bell Labs technical Journal Apr.-Jun. 2000.*

* cited by examiner

*Primary Examiner*—Wing Chan
*Assistant Examiner*—Richard Chang
(74) *Attorney, Agent, or Firm*—Imperius Patent Works; Darien K. Wallace; T. Lester Wallace

(57) ABSTRACT

To set up an inter-network connection, a local connection setup message is transmitted from a first local network through a transit network to a second local network. The receipt of the local setup message at an entry point to the transit network results in a transit setup message being transmitted in parallel with the local setup message through the transit network. The transit setup message initiates the setup of a transit network connection through which the inter-network connection transits the transit network. To synchronize establishing the connections, the local setup message is delayed at an exit point of the transit network before being forwarded through the second local network to set up the inter-network connection. The local setup message is delayed at least until the transit setup message is received at the exit point so that the transit network connection is established before it is needed for the inter-network connection.

15 Claims, 3 Drawing Sheets

INTER-NETWORK CONNECTION SETUP THROUGH A TRANSIT NETWORK

CROSS REFERENCE TO RELATED APPLICATION

This application is based on and hereby claims priority to German Application No. 102 08 048.8 filed on Feb. 25, 2002, in Germany, the contents of which are hereby incorporated by reference.

TECHNICAL FIELD

The present invention relates to setting up network connections over a plurality of communications networks. More specifically, the invention relates to setting up an inter-network connection through a transit network connection.

BACKGROUND

To set up connections in contemporary communications systems, for example, voice, video and multimedia connections, the connections must be established over a plurality of communications networks. Such networks include both long distance networks that function as transit networks, as well as local networks. A long distance network may be a Wide Area Network (WAN), and a local network may be a Local Area Network (LAN). A different connection setup protocol is frequently used in the long distance transit network from that used in the local networks, which contain the source and destination points of a connection.

A typical use for establishing connections over local and transit networks is the setting up of a narrowband inter-network connection over a broadband network that functions as a transit network. In this example, the narrowband inter-network connection can be a real time voice communication. In order to set up such a narrowband inter-network connection, it is necessary to perform narrowband signaling between the source and destination of the connection in accordance with a local connection setup protocol. In addition, however, it is also necessary to perform signaling in accordance with a broadband connection setup protocol in order to set up a broadband user data connection via the broadband network.

According to the prior art, such a broadband transit connection is set up completely before sending a narrowband connection setup message into the broadband network. Once the setup of the broadband transit connection has been confirmed, the narrowband connection setup message is transferred through the broadband network into the target network, and the narrowband connection setup can be continued. This method ensures that the broadband transit connection is set up by the time it is required for the transmission of the narrowband connection setup message.

The total time period that is required to setup the narrowband inter-network connection between the source and destination points is the sum of the setup times for a pure narrowband inter-network connection and a pure broadband transit connection. In comparison with a pure narrowband inter-network connection, the setup time for a narrowband connection that is routed through a broadband transit network having a different connection setup protocol can thus become considerably longer. These longer setup times can together lead to considerable delays, in particular when there are connections that are routed over a plurality of transit networks.

Thus, setting up an inter-network connection using a narrowband connection setup message that is transmitted between networks over a transit network that uses a connection setup protocol specific to the transit network involves waiting for the sum of the setup times for the inter-network connection and the connection of each transit network. A method is therefore sought that reduces the time to setup an inter-network connection using a narrowband connection setup message that is transmitted between networks over a transit network. An apparatus is desired that carries out the faster setup.

SUMMARY

In order to set up an inter-network connection, a local connection setup message is transmitted from a first local network through a transit network to a second local network. The local connection setup message is sent from a connection source through a transit network to a connection destination, for example an end device, a switching device or a network node. When the local connection setup message arrives at an entry point to the transit network, a transit connection setup message used for setting up a transit network connection is transmitted simultaneously with the local connection setup message through the transit network. The transit setup message initiates the setup of a transit network connection through which the inter-network connection will transit the transit network. To synchronize setting up the transit network connection and the inter-network connection, the local setup message is delayed at an exit point of the transit network before being forwarded through the second local network to set up the inter-network connection. Examples of entry points and exit points to the transit network are bridges, gateways, routers and interworking units. The local setup message is delayed at least until the transit setup message is received at the exit point so that the setup of the transit network connection is complete when the transit network connection is required for establishing the inter-network connection through the transit network.

A network interworking device, such as an interworking unit, at the exit point of the transit network has means for receiving the local connection setup message, as well as the transit connection setup message. The interworking unit also has a memory buffer for storing the local connection setup message, as well as means for identifying whether the transit connection setup message is associated with the same inter-network connection as the local connection setup message stored in the memory. The interworking unit furthermore has means for forwarding the local connection setup message to the connection destination after the interworking unit receives a transit connection setup message that is associated with the same inter-network connection as the local connection setup message.

In one embodiment, the inter-network connection can be set up considerably faster than under the prior art. As opposed to the prior art, the interworking unit does not wait for the transit network connection to be set up completely before transmitting the transit connection setup message through the transit network. Instead, the local connection setup message and the transit connection setup message are transmitted in parallel through the transit network. The interworking unit delays forwarding the local connection setup message at the exit point of the transit network at least until the interworking unit receives the transit connection setup message. The establishment of the inter-network con nection is thus delayed until the transit network has been established. It is thereby possible to ensure with a high probability that the setting up of the transit network connection is essentially complete by the time the transit network connection is required for routing the inter-network connection between the local networks via the transit network.

In another embodiment, the time period required to establish an inter-network connection between two local networks via a transit network can be reduced to the greater of the time required to set up a pure transit network connection and the time required to set up a network connection that does not travel through a transit network.

Setting up an inter-network connection according to the aforementioned embodiments has a further advantage in that it can be accomplished by making only slight changes to existing communications systems. Only a small intervention into connection signaling is necessary, and no changes are necessary at the end points of the inter-network connection.

This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Figure 1:
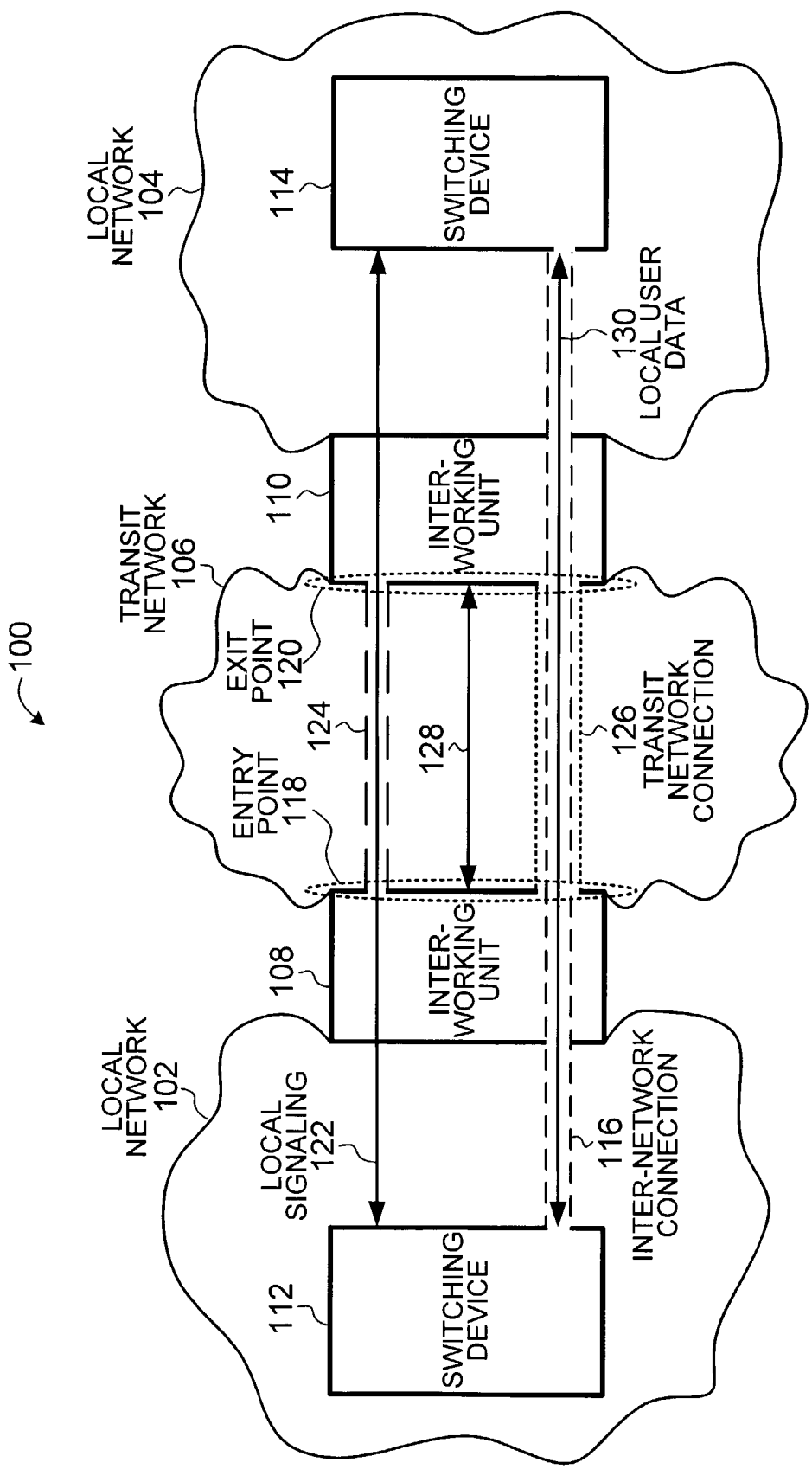
FIG. 1 is a simplified schematic diagram of a system for setting up an inter-network connection.

Reference will now be made in detail to some embodiments of the invention, examples of which are illustrated in the accompanying drawings. FIG. 1 is a schematic illustration of a communications system 100 with a first local network 102 and a second local network 104. Real-time voice communication is to be provided by the local networks, which are connected by a transit network 106. The transit network 106 provides a transit connection between the first local network 102 and the second local network 104.

The transit network 106 can, for example, be a local area network (LAN), a long distance network, a wide area network (WAN), the Internet, a backbone network, or an ATM (Asynchronous Transfer Mode) network. Although the transit network 106 would commonly be a broadband network, a narrowband network could also function as a transit network. Each of the local networks 102, 104 can operate as either a circuit-switched communications network or a packet-oriented communications network. Although the local networks 102 and 104 can be narrowband networks, broadband local networks can also be connected by transit networks.

In this embodiment, where a local network operates as a packet-oriented network, the local network permits the setup of switched virtual circuits (also called virtual channels), for example, according to an ATM protocol, MPLS (Multi-Protocol Label Switching) protocol or the ITU-T Recommendation H.323. A connection setup under this embodiment applies to any desired data stream.

In order to set up user data connections, a transit connection setup protocol is used to setup a connection in the transit network 106, and a local connection setup protocol is used to setup a connection in each of the local networks 102 and 104. According to this embodiment, connections are set up in a combination of transit networks and local networks. The application of the invention need not be restricted to broadband and narrowband networks. Instead, the invention can be applied to any desired combination of communications networks having different connection setup protocols.

The transit network 106 is connected to the local network 102 by an interworking unit 108, and to the local network 104 via an interworking unit 110. Each interworking unit 108 and 110 can be implemented, for example, as a gateway device, a bridge, or a router device.

In this embodiment, the local network 102 contains a switching device 112 that is to be connected to a second switching device 114 in the second local network 104 through an inter-network user data connection 116. The switching devices 112 and 114 can be public branch exchanges (PBXs) or network nodes of the local networks 102 and 104, respectively. In another embodiment, each switching devices 112 and 114 can be replaced with a communications terminating device, a personal computer, a client application or a communications server.

The inter-network connection 116, which is to be set up, runs from the local network 102 to the local network 104 through the interworking unit 108. The interworking unit 108 is situated at an entry point 118 into the transit network 106, and the interworking unit 110 is situated at an exit point 120 from the transit network 106.

The setup of the inter-network connection 116 is initiated by sending local signaling 122 between the switching devices 112 and 114 that complies with the local connection setup protocol. The local signaling 122 is transmitted through the transit network 106 within a transit signaling tunnel connection 124 that is set up between the interworking units 108 and 110. The transit signaling tunnel connection 124 is indicated by dashed lines in FIG. 1. The transit signaling tunnel connection 124 is preferably set up as a dedicated signaling connection in advance of the steps to establish the inter-network connection 116. The transit signaling tunnel connection 124 is commonly referred to as an AAL5 (ATM Adaptation Layer) connection.

It is generally less expensive to set up a signaling tunnel connection than to set up a user data dedicated connection, such as the inter-network user data connection 116. It may even be acceptable, in terms of cost, to set up dedicated signaling tunnel connections between a plurality of, or all of, the interworking units connected to a transit network. Setting up dedicated signaling connections, such as transit signaling tunnel connection 124, in advance has the advantage that local signaling 122 can be transmitted very quickly through the transit network 106.

By means of the local signaling 122, the interworking units 108 and 110 are made to set up a transit network connection 126 between them. The transit network connection 126 is a user data connection that is referred to as an AAL1 connection. The transit network connection 126 is set up by sending transit signaling 128 between the interworking units 108 and 110 that complies with the transit connection setup protocol. The transit network connection 126 is indicated by means of narrow dashed lines in FIG. 1.

The inter-network connection 116 that is to be set up between the switching devices 112 and 114 is routed through the transit network 106 via the transit network connection 126, which itself is set up between the interworking units 108 and 110. The method according to the invention ensures, with a high degree of probability, that the setup of the transit network connection 126 is essentially completed by the time the transit network connection 126 is required to route the inter-network connection 116 through the transit network 106.

After the setup of the inter-network connection 116, local user data 130 is finally transmitted in a transparent fashion within the inter-network connection 116 between the switching devices 112 and 114. The inter-network connection 116 is indicated in FIG. 1 by dashed lines.

Figure 2:
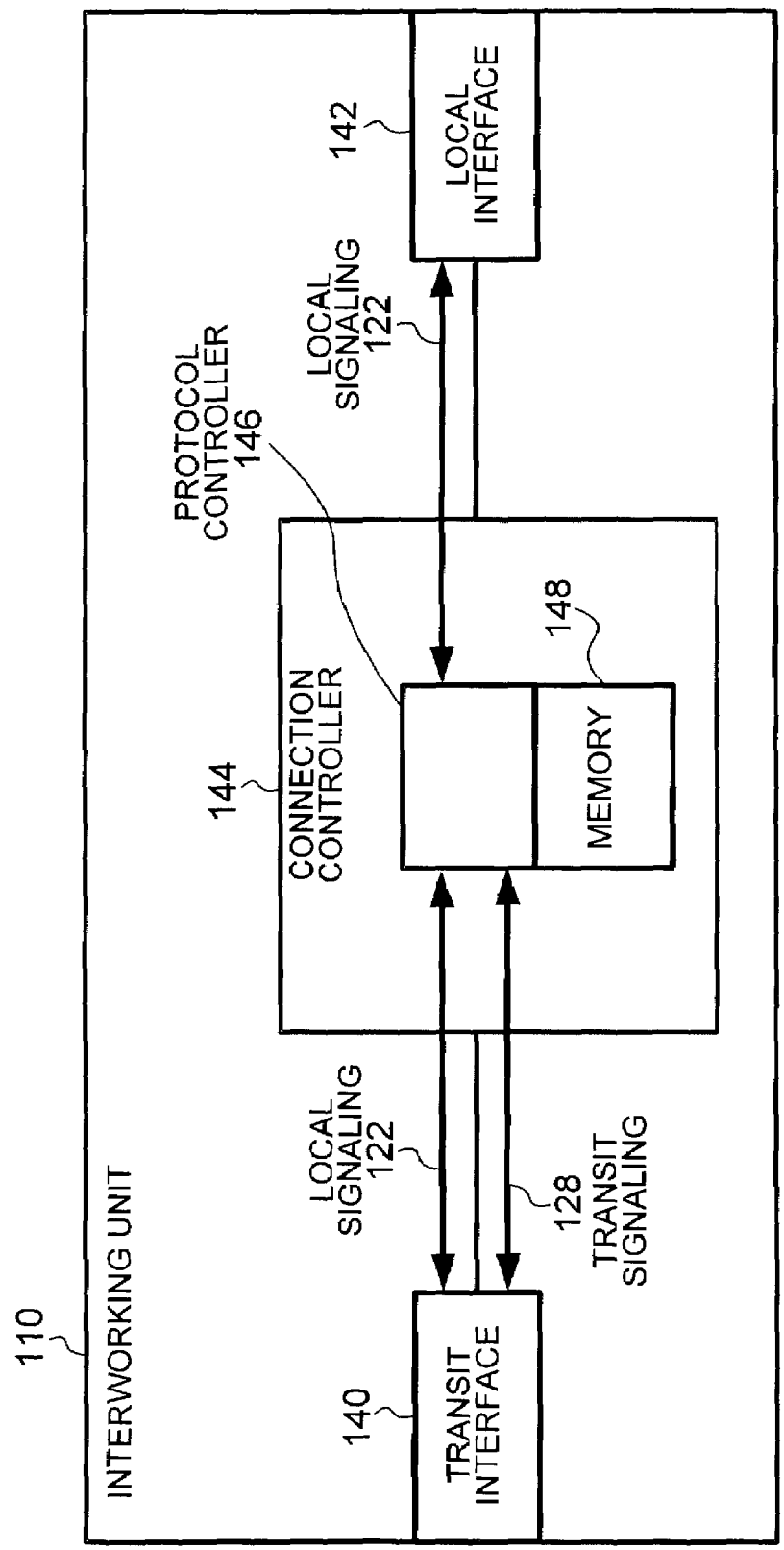
FIG. 2 is a diagram of an interworking unit for setting up an inter-network connection between two networks.

FIG. 2 shows the interworking unit 110. The interworking unit 110 has a transit interface 140 for connecting to the transit network 106 and a local interface 142 for connecting the local network 104. Furthermore, the interworking unit 110 has a connection controller 144 that is connected to the transit interface 140 and the local interface 142. The connection controller 144 contains a protocol controller 146 for processing both the local connection setup protocol and the transit connection setup protocol, as well as a memory 148 that is coupled to the protocol controller 146 and that stores connection setup protocol messages.

The protocol controller 146 exchanges the transit signaling 128 with the transit network 106 through the transit interface 140. The protocol controller 146 also exchanges the local signaling 122, which is transmitted within the transit signaling tunnel connection 124, with the local network 104 through the local interface 142.

Figure 3:
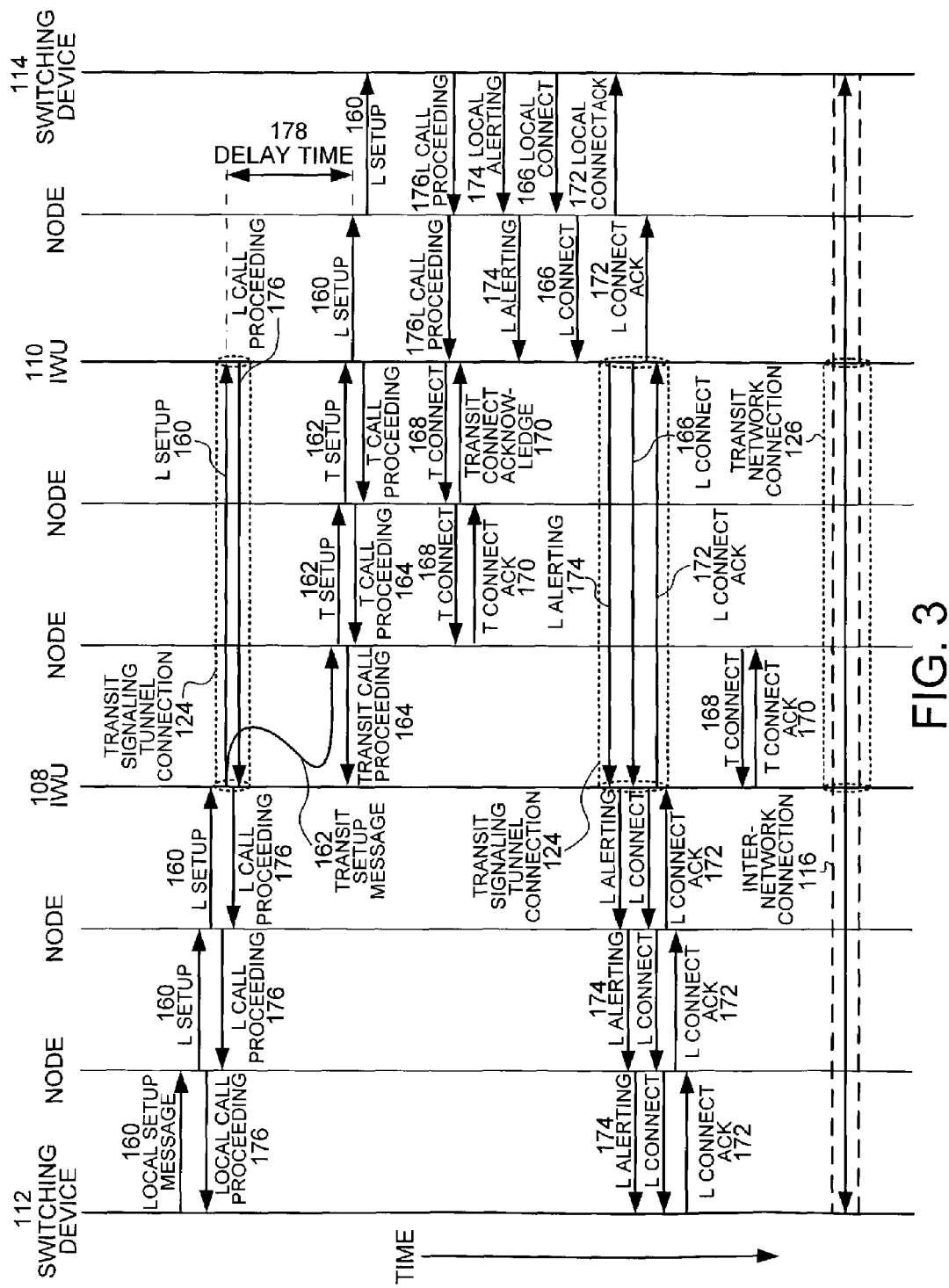
FIG. 3 is a flowchart showing the signaling traffic during the setup of an inter-network connection.

FIG. 3 shows a flowchart illustrating the signaling traffic between the switching devices 112 and 114, as well as between the interworking units 108 and 110, for setting up the inter-network connection 116.

In this embodiment, the switching device 112 initiates the setup of the inter-network connection 116 by transferring a local connection setup message 160 to the interworking unit 108 using the local signaling 122. The interworking unit 108 receives the local connection setup message 160 via a local interface and feeds it to a protocol controller. The local connection setup message 160 is transmitted virtually without delay by the interworking unit 108 within the previously established transit signaling tunnel connection 124 through the transit network 106 to the interworking unit 110. The interworking unit 110 receives the local setup message 160 via the transit interface 140 and supplies it to a protocol controller 146. The protocol controller 146 does not immediately pass on the local setup message 160, but rather stores message 160 in the memory 148.

The receipt of the local setup message 160 by the interworking unit 108 also causes the transit setup message 162, which is specific to the transit network 106, to be transmitted using transit signaling 128 in order to set up the transit network connection 126. The interworking unit 108 transmits the transit setup message 162 and the local setup message 160 virtually simultaneously into the transit network 106. In FIG. 3, the fact that transit setup message 162 is transmitted virtually simultaneously with local setup message 160 is indicated by the curved arrow of message 162 that originates together with message 160. By showing the arrow of message 162 beginning with the arrow of message 160 is not meant to indicate that transit setup message 162 is sent through the transit signaling tunnel connection 124.

The transit setup message 162 is transmitted through the transit network 106 to the interworking unit 110, where it is received by transit interface 140 and passed on to the protocol controller 146. Furthermore, in response to the receipt of the transit setup message 162 by nodes within transit network 106, those nodes return a transit call proceeding message 164 to the node that sent the transit setup message 162. Similarly, in response to the receipt by the interworking unit 110 of the transit setup message 162, the protocol controller 146 returns a transit call proceeding message 162 into the transit network 106. Also in response to the receipt of the transit setup message 162 by the interworking unit 110, the protocol controller 146 returns a transit connection initiation message 168 that propagates back through the nodes of the transit network 106 to the interworking unit 108.

After receiving the transit setup message 162, the protocol controller 146 of interworking unit 110 checks whether message 162 is associated with the local setup message 160 that is stored in the memory 148. The check can be carried out on the basis of the connection information contained in the local setup message or in the transit setup message. If an association between transit setup message 162 and a local setup message in the memory 148 is found, the local setup message, in this case message 160, is read from the memory 148, output from local interface 142 and forwarded to the switching device 114.

Depending on network-specific time matching requirements, the protocol controller 146 delays forwarding the local setup message 160. In FIG. 3, the forwarding of local setup message 160 is delayed until the interworking unit 110 receives the associated transit setup message 162. This period of delay is shown as delay time 178. Forwarding message 160 can also be delayed until interworking unit 110 returns a transit call proceeding message 164 (T CALL PROCEEDING) or a transit connection initiation message 168 (T CONNECT). Forwarding can also be delayed until the arrival at interworking unit 110 of a transit connection acknowledgement message 170 (T CONNECT ACK). Alternatively, it is also possible to use any other messages that, in the course of setting up the transit network connection 126, arrive at the interworking unit 110, or are transmitted by it, to initiate or to delay the forwarding of the local setup message 160.

Furthermore, forwarding the local setup message 160 can also be delayed until completion of connection-specific adjustments. A connection-specific adjustment is executed by the connection controller 144 based on a connection-specific information item that is contained in the local setup message 160 that has been stored in the memory 148.

In cases where a transit setup message arrives at interworking unit 110 before an associated local setup message, the transit setup message can be stored in interworking unit 110. For example, if transit setup message 162 propagates through the transit network 106 faster than the local setup message 160 travels through the transit signaling tunnel connection 124, reception information associated with transit setup message 162 can be stored in the memory 148. When the local setup message 160 subsequently arrives at the interworking unit 110, the relevant reception information is available, and the local setup message 160 can be passed on immediately.

In the examples mentioned above, the setting up of the inter-network user data connection 116 is continued as the local setup message 160 is forwarded to its destination, switching device 114. In parallel with this, interworking unit 110 also transmits the T CONNECT message 168, which propagates back to the interworking unit 108, resulting in the transit network connection 126 being set up. As each node receives the T CONNECT message 168, that node returns the T CONNECT ACK message 170 to the node that sent the T CONNECT message 168.

As the T CONNECT message 168 propagates towards the interworking unit 108 and the T CONNECT ACK message 170 is returned to the interworking unit 110, a local call proceeding message 176 (L CALL PROCEEDING) is returned by each node in local network 104 that receives local setup message 160. When switching device 114 receives local setup message 160, it returns not only L CALL PROCEEDING message 176, but also a local ringing message 174 (L ALERTING) and a local connection initiation message 166 (L CONNECT). L ALERTING message 174 and L CONNECT message 166 propagate from switching device 114 back to switching device 112 through the transit signaling tunnel connection 124. The inter-network connection 116 and the transit network connection 126 are thus set up largely during the same time period.

After the T CONNECT message 168 reaches the interworking unit 108 and each node that transmits the T CONNECT message 168 receives the T CONNECT ACK message 170, the process of setting up the transit network connection 126 between the interworking units 108 and 110 is essentially complete. The inter-network connection 116 is then set up between the switching devices 112 and 114 through the transit network connection 126 after the L CONNECT message 166 reaches the switching device 112 and has been acknowledged by the L CONNECT ACK message 172. Finally, the local user data 130 can be transmitted in a transparent form between the switching devices 112 and 114 through the inter-network connection 116.

The transmission of the local connection setup message 160 initiated the local connection setup at some time before the completion of the transit connection setup. Therefore, portions of the local connection setup are carried out in parallel with the transit connection setup in terms of time.

In contrast to the prior art, the local setup message 160 is not delayed at the entry point 118 into the transit network 106, but rather at the exit point 120 from the transit network 106. Because the local setup message 160 is transmitted through the transit network 106 without any delay and in parallel with the transit setup message 162, the inter-network connection 116 is set up at the same time as the transit network connection 126 is set up. The delay of the local setup message 160 at the exit point 120, interworking unit 110 in this example, results in the setting up of the inter-network connection 116 being synchronized to the setting up of the transit network connection 126. The setup of the inter-network connection 116 and the transit network connection 126 are synchronized so that there is a high probability that the transit network connection 126 is set up by the time it is needed for the inter-network connection 116. In order to increase this probability even further, the delay time period 178 by the interworking unit 110 in forwarding the local setup message 160 can be adjusted. In addition, it is possible to provide measures in order to prevent the L CALL PROCEEDING message 176, the L ALERTING message 174 and/or the L CONNECT message 166 from overtaking the T CALL PROCEEDING message 164 and the T CONNECT message 168 in the transit network 106. For example, the L CONNECT message 166 can be prevented from reaching the switching device 112 before the T CONNECT message 168 reaches the interworking unit 108. Alternatively, the fact that a local connection message has reached its destination before a transit connection message has reached its destination can at least be identified.

In accordance with this embodiment, the setup time for the inter-network connection 116 is essentially determined by the greater of the delay time periods for a pure transit network connection and for a pure inter-network connection. Generally, the setup time for a pure inter-network connection is greater, and the setup time for the inter-network connection 116 is only insignificantly longer than the setup time of the pure inter-network connection.

In the prior art, the setup time for an inter-network connection was, in contrast, determined by the sum of the setup times for a pure transit network connection and for a pure inter-network connection. The present invention thus makes it possible to reduce considerably the setup time for inter-network connections in comparison with the prior art without significant additional expenditure. This speed advantage is all the more pronounced the more transit networks there are between the switching devices 112 and 114, or between the local networks 102 and 104.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   (a) an entry point into a second network receiving a first connection setup message, the first connection setup message being transmitted from a first network through the second network to a third network so as to set up an inter-network connection between the first network and the third network;
   (b) transmitting a second connection setup message from the entry point to an exit point of the second network, the receipt of the first connection setup message at the entry point initiating the transmission of the second connection setup message, the second connection setup message initiating setup of a transit network connection through the second network;
   (c) transmitting the first connection setup message from the entry point to the third network substantially simultaneously with the transmission of the second connection setup message;
   (d) delaying the first connection setup message at the exit point of the second network at least until the exit point receives the second connection setup message; and
   (e) after the delaying of (d) forwarding the first connection setup message to the third network.

2. The method of claim 1, wherein the first connection setup message is transmitted through a transit signaling tunnel connection that is set up through the transit network.

3. The method of claim 1, wherein the first connection setup message is stored in an interworking unit at the exit point until the second connection setup message is received at the exit point.

4. The method of claim 3, wherein the interworking unit at the exit point executes a connection-specific adjustment while the first connection setup message is being delayed based on a connection-specific information item contained in the first connection setup message.

5. The method of claim 1, wherein the inter-network connection is a narrowband connection and the transit connection is a broadband connection.

6. The method of claim 1, wherein the first connection setup message is a narrowband connection setup message and the second connection setup message is a broadband connection setup message.

7. An interworking unit for setting up an inter-network connection from a first network through a second network to a third network, comprising:
   (a) a transit interface that receives a first connection setup message for setting up the inter-network connection, the transit interface also receiving a second connection setup message for setting up a transit network connection through the second network, the inter-network connection crossing the second network through the transit network connection;

(b) a memory storing the first connection setup message;

(c) a protocol controller that identifies whether the second connection setup message and the first connection setup message are associated with the same inter-network connection; and (d) a local interface that forwards the first connection setup message to the third network after the protocol controller receives the second connection setup message and identifies that the second connection setup message and the first connection setup message are associated with the same inter-network connection.

8. The interworking unit of claim 7, further comprising a connection controller that executes a connection-specific adjustment based on a connection-specific information item contained in the first connection setup message, the connection-specific adjustment being executed after the first connection setup message is received and before the first connection setup message is forwarded to the third network.

9. The method of claim 1, wherein the transit network connection is an ATM adaptation layer 1 (AAL1) connection.

10. The method of claim 2, wherein the transit signaling tunnel connection is an ATM adaptation layer 5 (AAL5) connection.

11. The interworking unit of claim 7, wherein the interworking unit is implemented as a device taken from the group consisting of: a gateway device, a bridge, and a router device.

12. The interworking unit of claim 7, wherein the first connection setup message comprises local signaling, and wherein the protocol controller exchanges the local signaling with the third network through the local interface.

13. The interworking unit of claim 12, wherein the local signaling is transmitted within a transit signaling tunnel connection through the second network.

14. The interworking unit of claim 13, wherein the transit signaling tunnel connection is an ATM adaptation layer 5 (AAL5) connection.

15. The interworking unit of claim 7, wherein the transit network connection is an ATM adaptation layer 1 (AAL1) connection.

* * * * *